United States Patent [19]

Okada et al.

[11] 4,403,265
[45] Sep. 6, 1983

[54] POWER LOADING/UNLOADING MECHANISM FOR TAPE RECORD/PLAYBACK APPARATUS

[75] Inventors: Hitoshi Okada; Kazuki Takai; Katsumi Yamaguchi, all of Toda, Japan

[73] Assignee: Clarion Company, Ltd., Tokyo, Japan

[21] Appl. No.: 252,678

[22] Filed: Apr. 9, 1981

[30] Foreign Application Priority Data

Apr. 9, 1980 [JP] Japan ............................ 55-47069[U]

[51] Int. Cl.³ .................. G11B 17/00; G11B 15/18; G11B 15/00
[52] U.S. Cl. ................................. 360/96.5; 360/71; 360/105
[58] Field of Search .............. 360/96.5, 105, 93, 137, 360/71, 96.1, 96.6; 242/198, 200

[56] References Cited

U.S. PATENT DOCUMENTS

| | | | |
|---|---|---|---|
| 4,227,224 | 10/1980 | Umezawa | 360/96.5 |
| 4,308,562 | 12/1981 | Negishi | 360/71 |
| 4,319,292 | 3/1982 | Katoh | 360/96.5 |
| 4,337,487 | 6/1982 | Takai | 360/96.5 |
| 4,344,096 | 8/1982 | Tanaka | 360/105 |

*Primary Examiner*—Robert M. Kilgore
*Attorney, Agent, or Firm*—Flynn, Thiel, Boutell & Tanis

[57] ABSTRACT

A power loading/unloading mechanism for tape record/playback apparatus which comprises a gear driven by a motor, a rack member associated with a tape pack inserted; a partly cut-out gear independent of the rack member operation system and interlocked with a cam member for advancing and retreating a head plate; an engaging gear driven by the motor and disposed so as to engage with the partly cut-out gear; a means for keeping the engaging gear from engagement with teeth of the partly cut-out gear; and an engagement operating means for detecting completion of tape pack loading and for putting the engaging gear into mesh with the teeth of the partly cut-out gear.

3 Claims, 11 Drawing Figures

POWER LOADING/UNLOADING MECHANISM FOR TAPE RECORD/PLAYBACK APPARATUS

BACKGROUND OF THE INVENTION

1. Field of the Invention

This invention relates to a power loading/unloading mechanism for a tape record/playback apparatus which is capable of improving an operability thereof.

2. Description of the Prior Art

In a tape player of such a type as widely used for a car tape player in which a tape pack is inserted horizontally from the front of the player, a loading operation is effected as follows: the tape pack is inserted horizontally to a predetermined position, the tape pack is then moved vertically to engage with reel shafts and capstans, a head and a pinch roller are put into the tape pack, and the reel shafts start their rotation. To unload the inserted tape pack, the aforesaid procedures are carried out in the reversed sequence. As can be easily understood, a considerable force is required to carry out these operations, and it has been proposed to utilize urging forces of springs and divide loads between various operations of loading or unloading to reduce the force required for loading or unloading. This mechanism, however, has a limitation in reduction of the required force, and there has been proposed a "power loading" which utilizes a driving force of a motor driving the tape pack loading operation to store forces on springs, thereby to reduce the necessary operating force. More specifically, in this power loading mechanism, most of the operations are carried out at the time of tape pack insertion and forces required for succeeding ejection are stored at the same time. Therefore, a considerable loads are imposed on the mechanism, which causes problems in durability of the mechanism or the motor or in power of the motor.

SUMMARY OF THE INVENTION

It is therefore an object of the present invention to provide a power loading/unloading mechanism for a tape record/playback apparatus which is capable of obviating the problems involved in the prior arts as described above.

It is another specific object of the present invention to provide a power loading/unloading mechanism for a tape record/playback apparatus wherein a tape pack loading operation and a head displacement are carried out separate motor driving mechanisms to simplify the mechanism for ehancing accuracy and stability in the operations of the mechanism.

In accordance with the present invention, there is provided a power loading/unloading mechanism for a tape record/playback apparatus which comprises:

a gear member driven by a motor;

a rack member associated with a tape pack inserted;

a partly cut-out gear member independent of the rack member operation system and interlocked with a cam member for advancing and retreating a head plate;

an engaging gear driven by the motor and disposed so as to engage with the partly cut-out gear;

a means for keeping the engaging gear from engagement with teeth of the partly cut-out gear; and an engagement operating means for detecting completion of tape pack loading and for putting the engaging gear into mesh with the teeth of the partly cut-out gear.

DESCRIPTION OF THE PREFERRED EMBODIMENT

Figure 1:
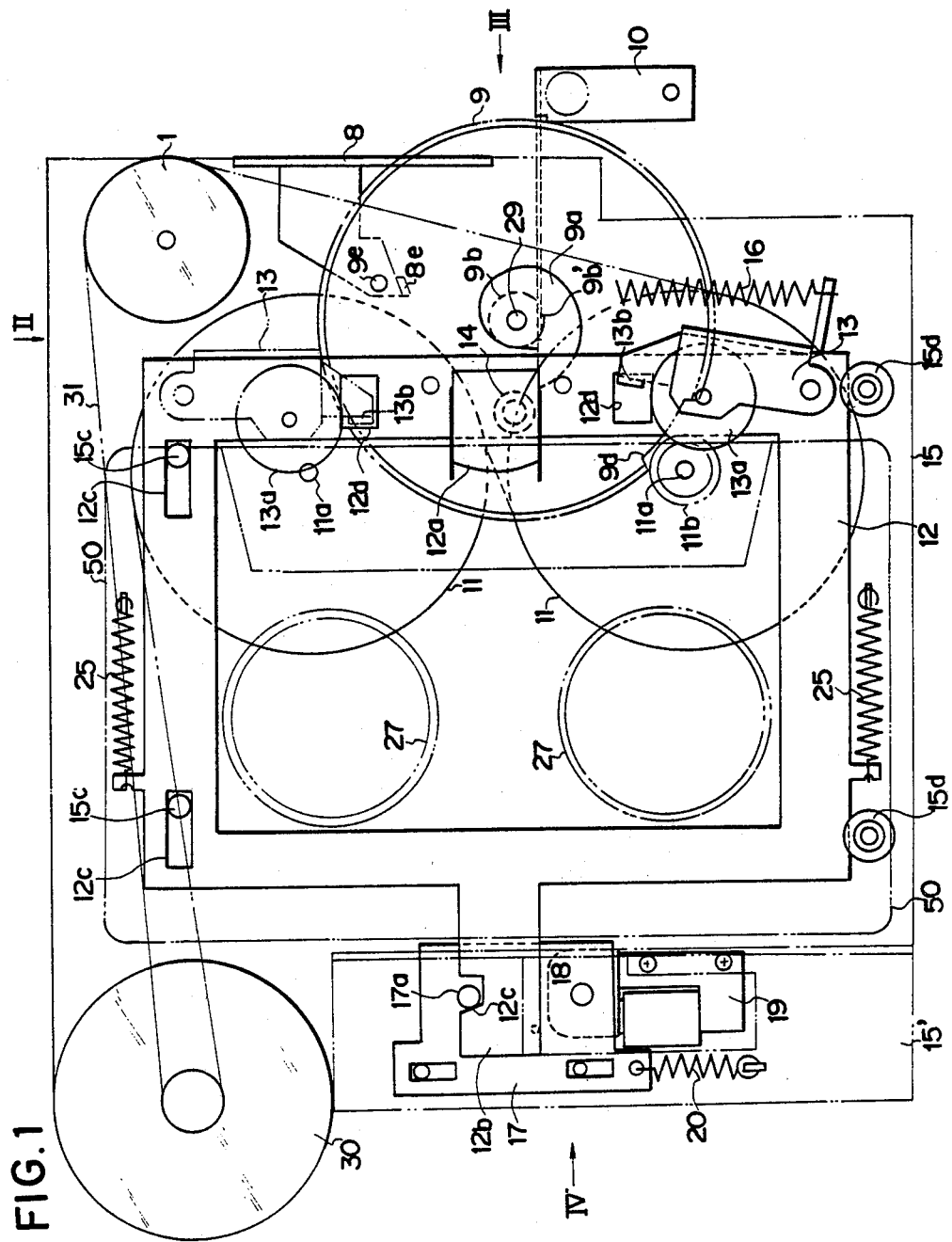
FIG. 1 is a plan view of a tape player equipped with a power loading mechanism of the present invention, illustrating details of an automatic stopping mechanism.
Figure 2:
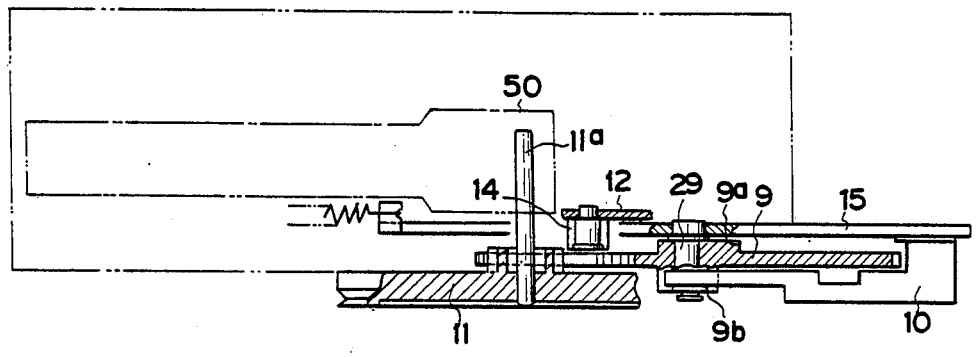
FIG. 2 is a side view of the tape player of FIG. 1, illustrated partly in section as viewed in the direction of arrow II.
Figure 3:
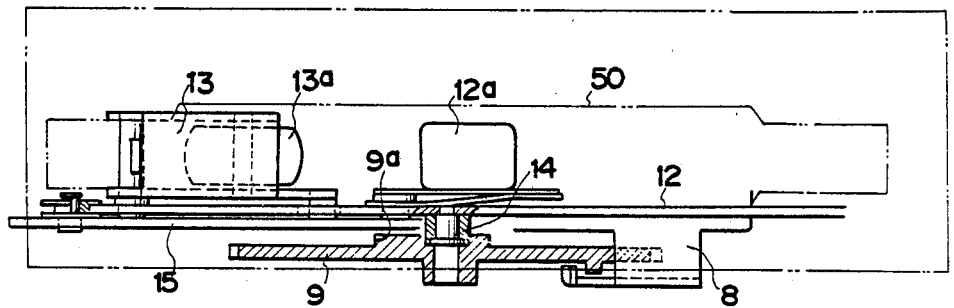
FIG. 3 is a similar side view of the tape player of FIG. 1, illustrated partly in section as viewed in the direction of arrow III.
Figure 4:
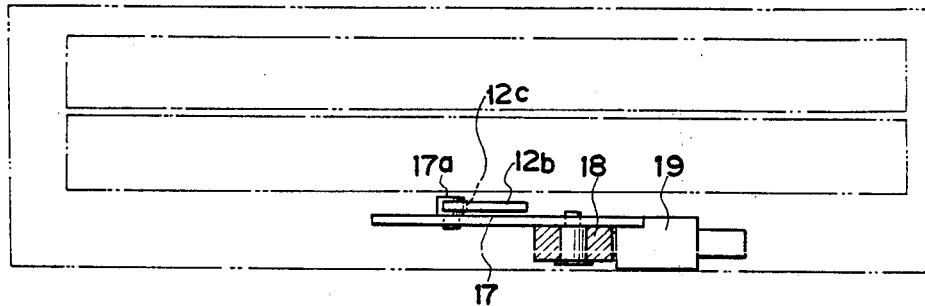
FIG. 4 is a similar side view of the tape player of FIG. 1, illustrated partly in section as viewed in the direction of arrow IV.

Referring now to the drawings, there is illustrated a preferred embodiment of the present invention. As illustrated in FIG. 1, a motor 30 is provided at a rear, sideward portion of a deck 15. A belt 31 is mounted between flywheels 11 provided on the deck 15 and the motor 30 as depicted in FIG. 1. A tension pulley 1 is provided at a rear, sideward position opposite to the motor 30 for providing desired belt drive onto the flywheels 11. The belt 31 is guided to one of the flywheels 11 through the tension pulley 1. Capstans 11a are fitted to the flywheels 11, respectively as can be apparently seen from FIG. 2. Pinch rollers 13a are provided so as to press a tape wound around reels of a tape pack 50 against the respective capstans 11a in a manner similar to that of a conventional tape player. More specifically, each of the pinch rollers 13a is fitted to a free end of a pinch roller frame 13 which is pivotally connected, at another end, to a head plate 12. A tension spring 16 as partly illustrated in FIG. 1 is provided between the pinch roller frames 13 to bias the respective free ends thereof, or the pinch rollers 13a, towards the respective capstans 11a. Each of the pinch roller frames 13 has, at the free end thereof, a bent hook 13b which is fitted in an engaging slot 12d formed on the head plate 12 which is shaped in a square plate with an opening as depicted in FIG. 1 and adapted to receive the capstans 11a and reel bases 27 in the opening. The head plate 12 is displaceable relative to the deck 15 by a guide pin 15c and a roller 15d and biased by the action of tension springs 25 provided at forward and rear sides thereof, respectively, to disengage a head 12a, which is provided at an intermediate portion of the head plate 12, from the tape pack 50 loaded on the deck 15. The head plate 12 has, on the lower face thereof, a roller 14 as depicted in FIGS. 2 and 3 which is disposed so as to be engageable with a cam portion 9a formed integrally with a partly cut-out gear 9. This partly cut-out gear 9 is rotatably mounted on the deck 15 by a pivotal shaft 29 as illustrated in FIG. 2. An engaging wheel 11b coaxial with one of the flywheels 11 is disposed so as to be engageable with the partly cut-out gear 9. When the engaging wheel 11b is positioned at a cut-out portion 9d of the partly cut-out gear 9 as shown in FIG. 1, a driving relation therebetween is not established, but when the partly cut-out gear 9 is rotated from the position of FIG. 1 to engage with the engaging wheel 11b, the partly cut-out gear 9 is rotated conjointly with the cam portion 9a. To carry out engaging and disengaging between the cut-out portion 9a and the engaging wheel 11b and to normally keep the engaging wheel 11b disengaged from the teeth of the gear 9, as boss 9b is provided integrally with the gear 9 and the cam portion 9a as depicted in FIG. 2. This boss 9b is disposed to abut against a resilient member 10 provided on the deck 15. When the resilient member 10 contacts, face to face, a flat portion 9b' of the boss 9b, the engaging wheel 11b is kept disengaged from the cut-away portion 9d. But, when the gear 9 is rotated counterclockwise as viewed in FIG. 1 through engagement between a projection 8e of a wheel locking plate 8 as will be described in detail later and a locking projection 9e projected from the lower face of the gear 9, the peripheral teeth of the gear 9 is brought into engagement with the engaging wheel 11b to impart rotation by the flywheel 11 to the gear 9.

The head plate 12 further has, at a sideward portion thereof, a projected portion 12b formed with an engaging portion 12c as illustrated in FIG. 1. A lock member 17a of a lock plate 17 slidable relative to the deck 15 is disposed so as to engage with the engaging portion 12c. The lock plate 17 has a spring 20 fitted thereto and an attractable member 18 which is disposed oppositely to an electromagnetic mechanism 19 for locking the lock plate 17.

Figure 5:
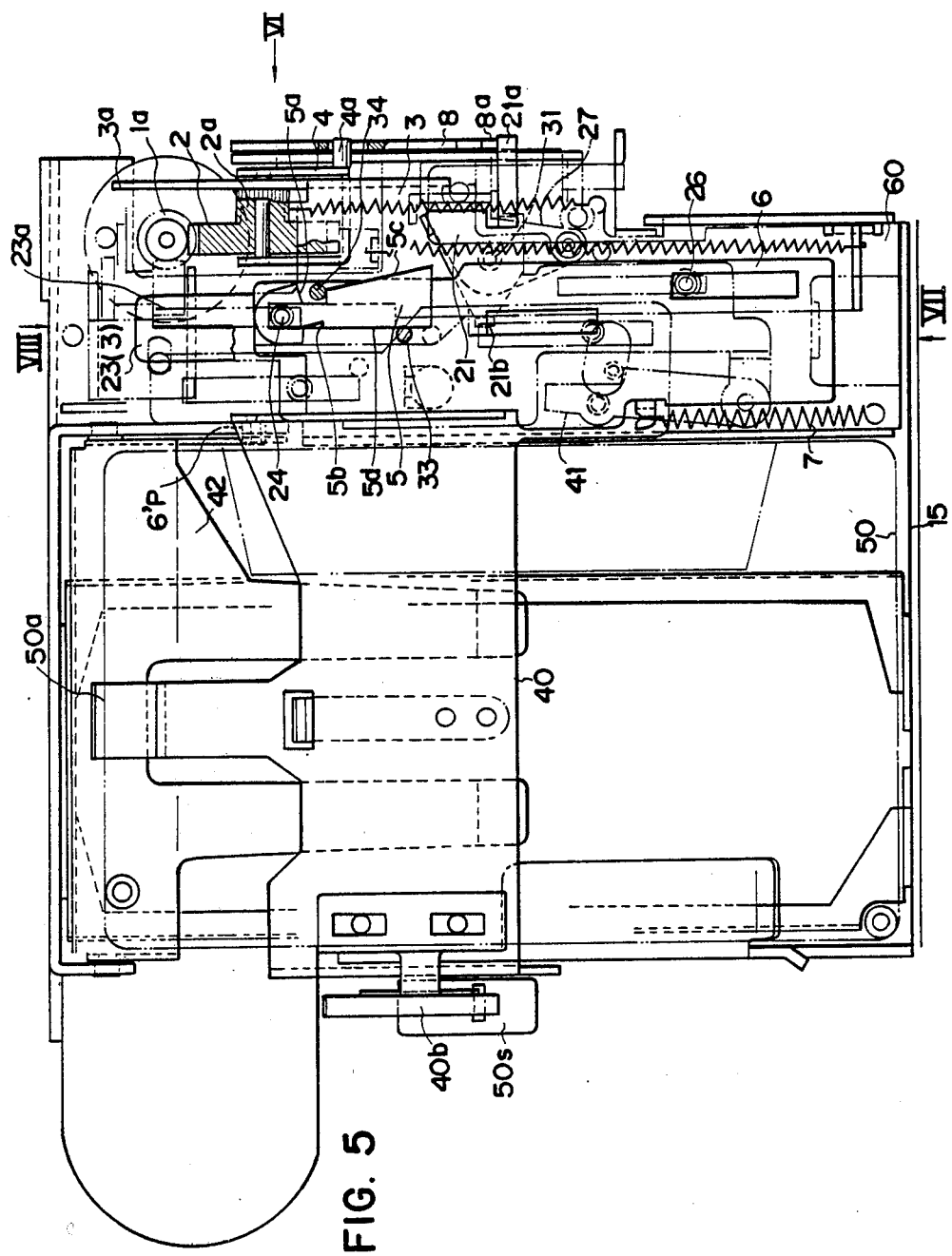
FIG. 5 is a plan view of the tape player equipped with the power loading mechanism of the present invention, illustrating details of an automatic loading mechanism in a partly cut-away manner.
Figure 6:
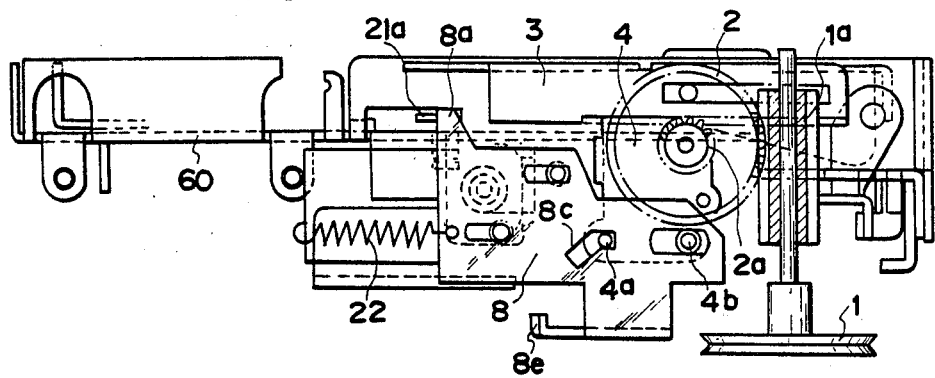
FIG. 6 is a partly cut-away side view of the tape player of FIG. 5 as viewed in the direction of arrow VI.
Figure 7:
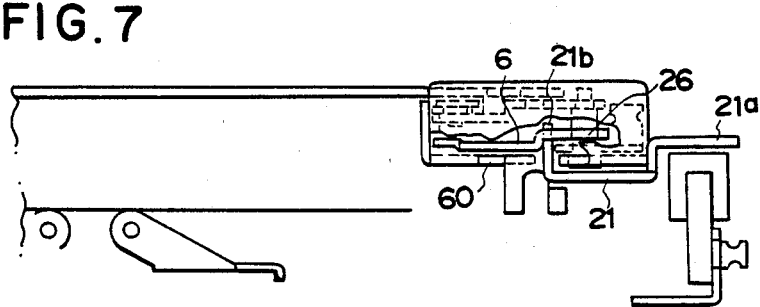
FIG. 7 is a similar partly cut-away side view of the tape player of FIG. 5 as viewed in the direction of arrow VII.
Figure 8:
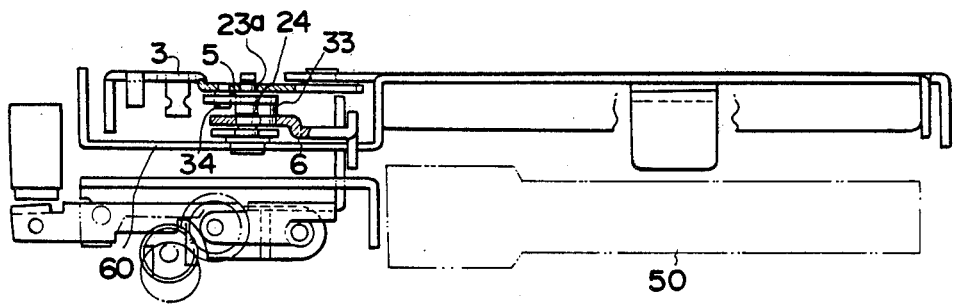
FIG. 8 is a similar partly cut-away side view of the tape player of FIG. 5 as viewed in the direction of arrow VIII.

A slide plate 40, which is displaceable through engagement with a rear end 50a of the tape pack when the tape pack is loaded, has, at a sideward portion thereof, a switch operating portion 40b. This switch operating portion 40b operates a switch 50s when the slide plate 40 is displaced to a predetermined position to drive the motor 30. A rack member 3 is provided in association with the slide plate 40. The rack member 3 is brought into engagement with the slide plate 40 and interlocked therewith by the action of an engaging member 41 when the slide plate 40 is moved backwardly to the predetermined position. The rack member 3 has a rack portion 3a extending along a side thereof which is engageable with a gear 2a integrally formed with a worm wheel 2 rotatable by the motor 30. Since the tension pulley 1 is rotated by the motor 30 and the worm wheel 2 is meshed with a worm 1a provided on the tension pulley 1 as depicted in FIG. 6, the rack member 3 displaced backwardly is further moved backwardlay to put the slide plate 40 to the rearmost position as shown in FIG. 5. Then, locking of an ejecting plate 6 by a lock releasing member 5 is released and a lowering frame member 42 provided at the interior portion of the deck 15 is operated by a pin 6p provided at a rear portion of the ejection plate 6 to lower the tape pack 50 into a record/playback position. The worm wheel 2 is supported by a gear frame 4 together with a gear 2a as can be seen from FIGS. 5 and 6. The gear frame 4 is mounted on a sidewall of the deck 15 by a pivotal member 4b and has, at a free end thereof, an engaging member 4a which is engaged with a cam slot 8c of the wheel locking plate 8 disposed along the sidewall of the deck 15. This wheel locking member 8 is used also as an engagement operating means in the apparatus of the present invention. A spring 22 is provided between the wheel locking member 8 and the deck 15 to bias the wheel locking member 8 leftwardly as viewed in FIG. 6. The wheel locking member 8 has, at a forward end thereof, a raised portion 8a which is engageable with a projected end 21a of an off-plate 21 rotatably mounted by a pivotal shaft 31 as depicted in FIG. 5. A power lock plate 27 is mounted coaxially with the off-plate 21 and engaged to operate.

The lock releasing member 5 and the ejecting plate 6 are disposed in association with the rack member 3. More specifically, the lock releasing member 5 is rotatably mounted by a pivotal member 24 and is formed with opposite cutouts 5a and 5b. The lock releasing member 5 further has engaging sides 5c and 5d. A pin 34 provided on the rack member 3 is disposed so as to engage with the engaging side 5c and the cutout 5a, while a pin 33 of the ejecting plate 6 is disposed so as to engage with the engaging side 5d and the cutout 5b.

When the rack member 3 is fully depressed backwardly as shown in FIG. 5, the pin 34 is released from the engaging side 5c and received in the cutout 5a to put the lock releasing member 5 into a position as illustrated. On the other hand, the pin 33 received in the cutout 5b is disengaged from the cutout 5b, so that the ejecting plate 6 is pulled forwardly by the spring 7. When the ejecting plate 6 is depressed from the position of FIG. 5 until the pin 33 is engaged with the cutout to lock the so depressed ejecting plate 6, locking with the rack member 3 is released to reset the rack member 3 by the action of the rack resetting spring.

Figure 9:
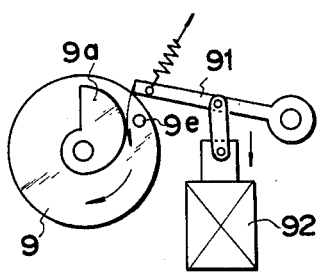
FIG. 9 is a plan view of a modified form of a cam member employable in the present invention.
Figure 10:
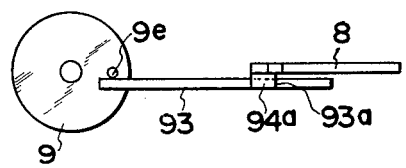
FIG. 10 is a plan view of a member for releasing the lock of a locking projection in association with a detecting member for detecting completion of tape pack drawing.
Figure 11:
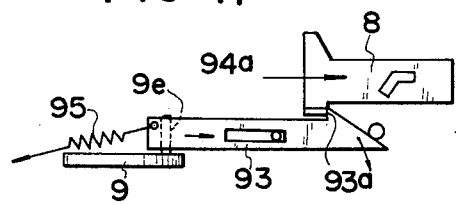
FIG. 11 is a side view of the lock releasing member of FIG. 10.

As a means for reengaging the engaging wheel 11b with the partly cut-out gear 9 and the cam 9a, there may alternatively be employed a mechanism as illustrated in FIG. 9 wherein an actuating lever 91 is operated by an electromagnetic plunger 92 to rotate the gear 9 through a projection 9e formed on the gear 9, thereby to engage with the engaging wheel 11b as described above in connection with FIG. 1. As a means for detecting completion of tape pack drawing operation to release locking of locking projection, there may alternatively be employed a mechanism as illustrated in FIGS. 10 and 11. More particularly, a lock lever 93 fitted with a spring 94 is operated by a pin 9e provided on a rotary member 9, and a lock portion 93a formed on the lock lever is released from a lock portion 94a formed on a member 94.

In the apparatus of the present invention arranged as described above, the motor 30 is rotated by the inserting operation of the cassette pack 50 and the tension pulley 1 is rotated by the motor 30. The rack member 3 is displaced by the worm 1a and the worm wheel 2 which are driven by the tension pulley 1 to effect automatic tape pack loading. When the tape pack drawing operation has been thus completed, the lock of the lock releasing member 5 with the ejecting plate 6 is released to pull the ejecting plate 6 forwardly. At the final stage of this ejecting plate resetting operation, an and 21b of the off-plate 21 is operated to displace the wheel locking plate 8 rightwardly as viewed in FIG. 6. Therefore, the gear frame 4 is rotated, by the cam slot 8c, counterclockwise as viewed in FIG. 6, around the pivotal shaft 4b to disengage the worm wheel 2 from the worm 1a. On the other hand, the projection 8e of the wheel locking plate 8 acts on the locking projection 9e of the gear 9 as illustrated in FIG. 1 to put the peripheral teeth of the partly cut-out gear 9 into engagement with the engaging wheel 11b. The partly cut-out gear 9 continues to rotate by the action of the flywheel rotating so that the cam portion 9a acts on the roller 14 of the head plate 12 to advance the head plate 12 towards the tape pack 50 loaded. When the head 12a of the head plate 12 is properly set (i.e., when the cam portion 9a makes on revolution), the pin 17a of the locking plate 17 is put into the engaging portion 12c by the action of the spring 20. As a result, the attractable member 18 is attracted by the electromagnetic mechanism 19 to lock the head plate 12 in the advanced position.

Under these conditions, when the power supply for electromagnetic mechanism 19 is cut off by a tape end signal, power-off operation of a car, a switching operation for ejection, etc., the head plate 12 is reset by the actions of the springs 25 provided at the opposite sides of the head plate 12 to dispel the pin 17a with the lock plate 17, along the slanting edge formed in the engaging portion 12c, and to release the attractable member from the electromagnetic mechanism for resetting the head plate 12. Upon resetting of the head plate 12, the tape pack is pushed forwardly by the actions of ejecting plate 6 and the rack member 3 as described above to effect the ejecting operation.

The apparatus of the present invention may alternatively be formed in an automatic stopping type wherein, in the ejection operation, resetting of the head plate is carried out automatically. In this case, if power is shut off during an operation of the apparatus, the pressure between the pinch roller and the corresponding capstan is released. Therefore, there can be effectively eliminated possible deformation or deterioration in performance of the pinch roller caused when the pinch roller is left long as pressed against the capstan. Furthermore, an operating force required for tape pack unloading can be reduced very much because no mechanical force is needed to restore the head plate which otherwise requires the largest force among the operating mechanisms of the apparatus.

As described above, in accordance with the present invention, the loading and unloading of the tape pack can be effected automatically utilizing the driving force of the motor, there can be provided an apparatus of high quality which requires only small operating force. Moreover, loads imposed during the operation are divided onto various mechanisms which can improve durability of the apparatus and ensure stable operation by a simple structure.

We claim:

1. A power loading/unloading mechanism for a tape record/playback apparatus which comprises:
   a first gear member driven by a motor;
   a second gear member engageable with said first gear member;
   a rack member engaged with said second gear member for setting a tape pack inserted into said apparatus to a play position therein;
   an engaging means for engaging said second gear member with said first gear member to move said rack member so as to set the tape pack to the play position and then disengaging said second gear member from said first gear member;
   a third gear member driven by said motor;
   a partly cut-out gear member disposed so as to engage with the third gear member;
   a cam member interlocked with said partly cut-out gear member for advancing a head plate;
   a keep means for keeping the third gear from engagement with the teeth of the partly cut-out gear; and
   an engagement operating means responsive to completion of tape pack loading by said engaging means for putting said third gear member into mesh with the teeth of the partly cut-out gear so that said cam member advances the head plate to the tape pack.

2. A mechanism according to claim 1 which further comprises a slide member engageable with the tape pack, a switch for switching a power of the motor, said slide member including a switch operating portion for operating said switch when said slide member is slid into the apparatus by the tape pack inserted therein.

3. A mechanism according to claim 1 which further comprises:
   a projected portion with an engaging portion formed in the head plate;
   a lock plate having a pin provided thereon for engaging with and disengaging from said engaging portion and an attractable portion;
   an electromagnetic means for attracting the attractable portion when the head plate is advanced by said cam member and then the engaging portion thereof engages with the pin; and
   a spring means fitted to the head plate for resetting the head plate when said electromagnetic means is deenergized.

* * * * *